United States Patent Office 3,107,556
Patented Oct. 22, 1963

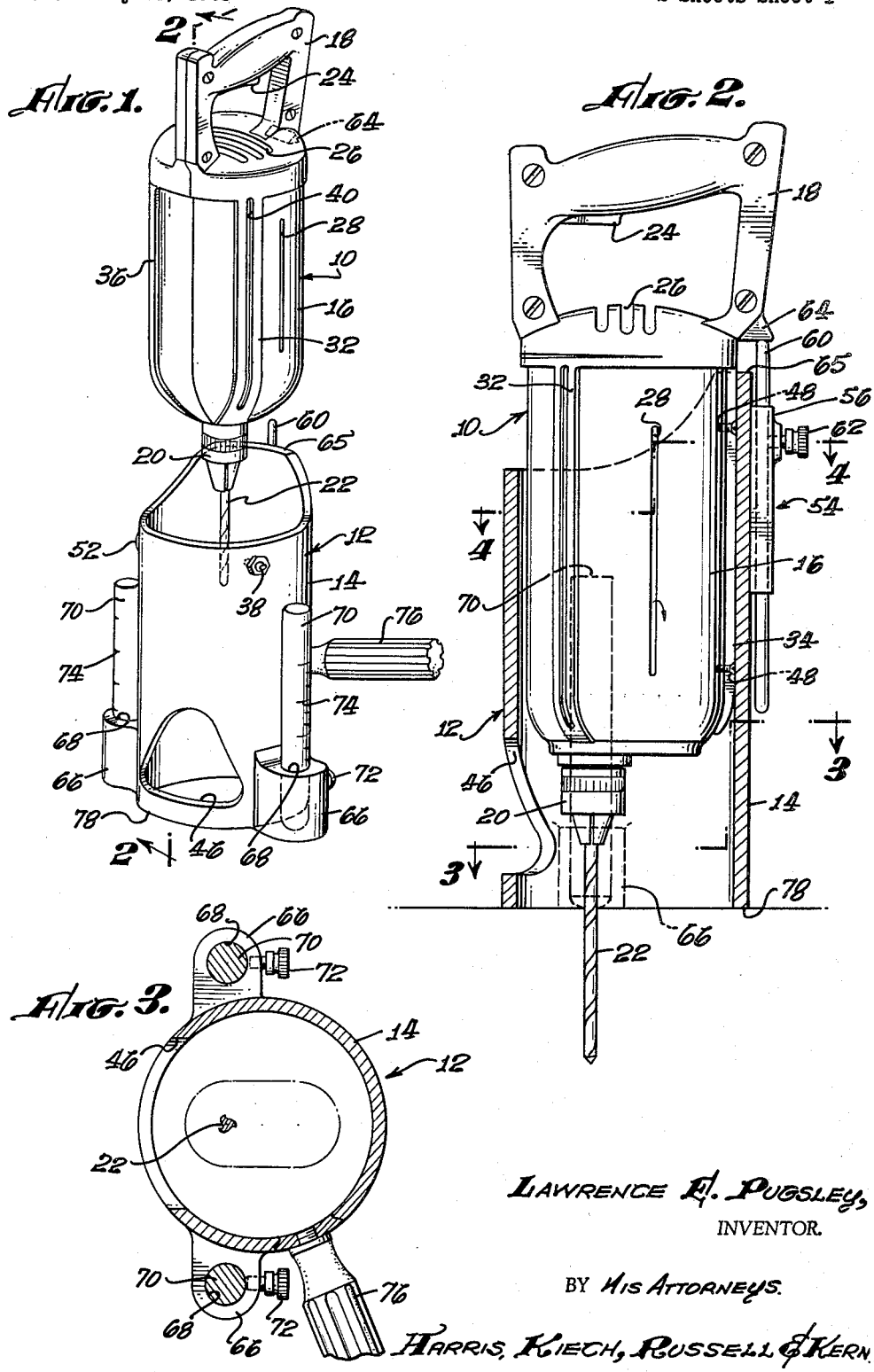

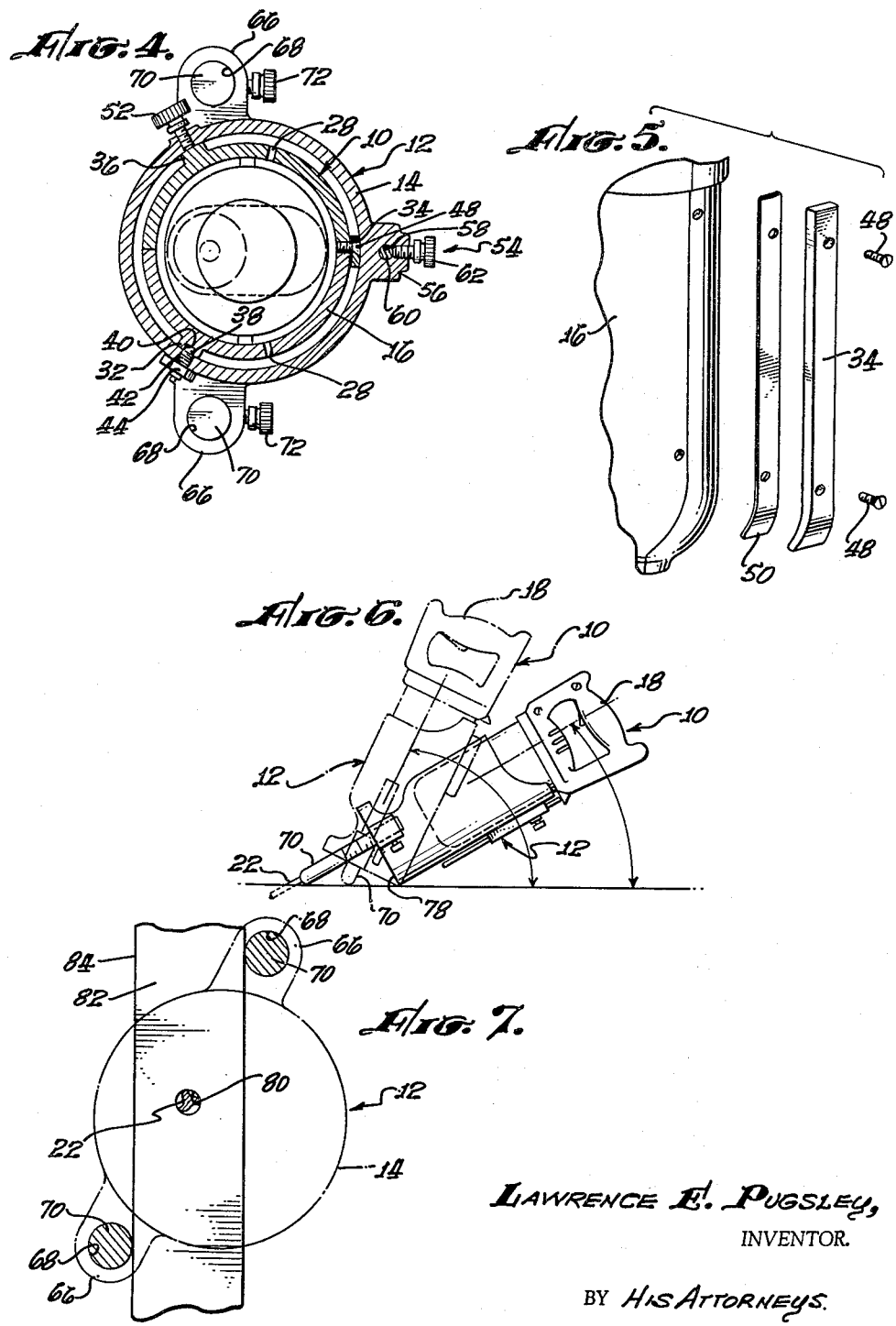

3,107,556
DRILL AND GUIDE THEREFOR
Lawrence E. Pugsley, Box 656, R.R. 1, Escondido, Calif.
Filed May 11, 1961, Ser. No. 109,316
3 Claims. (Cl. 77—55)

The present invention relates in general to drills and, more particularly, to a hand drill and drill guide combination, the invention preferably being applied to a motor-driven drill, such as an electric drill.

A primary object of the invention is to provide a guide for a hand drill which is manually maneuverable in conjunction with the drill to perform a wide variety of drilling operations quickly and accurately, including perpendicular drilling of a workpiece, slant drilling of a workpiece, drilling a centered hole in an edge of a workpiece, and the like.

More particularly, an important object of the invention is to provide a drill guide which includes simply a tubular guide member of a size to longitudinally slidably receive the drill therein, the guide member acting as a housing for the drill.

Another object of the invention is to provide a drill guide which includes keying means for preventing rotation of the drill relative to the guide member during longitudinal movement of the drill relative thereto. With this construction, an eccentrically located drill bit driven by the drill is always in the same circumferential position relative to the guide member.

Another important object of the invention is to provide a drill guide having longitudinally extensible and retractable legs which are carried by the guide member on opposite sides thereof and the axes of which lie in a plane containing the axis of the chuck of the drill, and thus the axis of a drill bit inserted into the chuck. With this construction, the legs may be projected into extended positions to help support the drill guide in an inclined position for accurate slant drilling, which is an important feature. Also, with the legs projected into their extended positions, a workpiece may be received edgewise between the legs so as to accurately locate the tip of a drill bit carried by the chuck precisely at the center of the edge of the workpiece, which is another important feature.

A further object of the invention is to provide a longitudinally adjustable stop carried by the guide member and engageable by the drill to limit longitudinal movement of the drill relative to the guide member, and thus limit the depth of a hole bored by the drill. A related object is to so limit longitudinal movement of the drill that the chuck cannot be projected out of the guide member into engagement with the workpiece, at least in perpendicular drilling.

Still another object is to provide a drill the housing of which is provided thereon with three circumferentially spaced longitudinal lands or ribs longitudinally slidably engageable with the internal surface of the tubular guide member, one of the ribs having a longitudinal groove therein which receives the keying means for preventing rotation of the drill relative to the guide member.

An important object is to provide a drill wherein at least one of the longitudinal ribs is detachable so that it may be shimmed radially outwardly from the drill housing to varying extents to insure a relatively close sliding fit of the drill in the guide member. Wear may be compensated for in this fashion, which is an important feature.

Yet another object of the invention is to provide the guide member with a window through which the tip of the drill bit may be visually observed during perpendicular drilling so as to insure engagement with the workpiece at the desired point.

The foregoing objects, advantages, features and results of the present invention, together with various other objects, advantages, features and results thereof which will be evident to those skilled in the hand drill art in the light of this disclosure, may be achieved with the exemplary embodiment of the invention described in detail hereinafter and illustrated in the accompanying drawings, in which:

FIG. 1 is a perspective view of the drill and drill guide of the invention showing the drill being inserted into the guide;

FIG. 2 is an enlarged longitudinal sectional view, taken as indicated by the arrowed line 2—2 of FIG. 1, showing the drill in place in the drill guide;

FIGS. 3 and 4 are transverse sectional views respectively taken along the irregular arrowed lines 3—3 and 4—4 of FIG. 2 of the drawings;

FIG. 5 is a fragmentary, exploded perspective view illustrating a shimmed guide land or rib of the invention;

FIG. 6 is a side elevational view on a reduced scale illustrating the invention in use to slant drill holes at two different angles; and FIG. 7 is a transverse sectional view, somewhat similar to FIG. 3, illustrating the invention in use to drill a centered hole in the edge of a workpiece.

Referring to the drawings, and particularly to FIGS. 1 and 2 thereof, the invention includes a motor-driven hand drill 10 and a guide 12 having a tubular, preferably generally cylindrical, guide member 14 into which the drill is longitudinally insertable and in which it is longitudinally slidable, as will be described.

Considering the drill 10 in more detail, it includes a generally cylindrical housing 16 provided at one end thereof with a handle 18, shown as a saw-type grip, and provided at the other end thereof with an eccentrically located chuck 20 adapted to receive a drill bit 22. The chuck 20 is driven, preferably through suitable gearing, not shown, by a motor, not shown, within the housing 16. Preferably, such motor is an electric motor controlled by a switch 24 incorporated in the handle 18 in a conventional manner. The housing 16 is provided in one end thereof and in the sides thereof with slots 26 and 28, or the equivalent, for the circulation of air through the housing to cool the motor therein.

The drill housing 16 is provided thereon with a plurality, preferably three, circumferentially spaced, longitudinal lands or ribs 32, 34 and 36 which are longitudinally slidably engageable with the inner wall of the tubular guide member 14 and which cooperate therewith to form a guide means for the housing 16. These ribs space the housing 16 from the guide member 14 so as to permit unobstructed cooling air flow through the housing when the drill 10 is inserted into the guide 12.

The drill 10 is keyed to the guide 12 against rotation relative thereto, when it is disposed in the guide, by a key 38 carried by the guide member 14 and extending radially inwardly into longitudinal groove 40 in the rib 32. The key 38 is shown as being the inner end of a pin which extends radially through the guide member 14 and which has a portion 42 threaded into the guide member and secured by a lock nut 44. With this construction, the key 38 can be retracted radially outwardly to permit withdrawal of the drill 10 from the guides 12 in the even that the end of the groove 40 nearest the chuck 20 lies in the same circumferential zone as the remainder of the groove. In the particular construction illustrated, however, the drill housing 16 tapers toward the chuck 20 so that the longitudinal rib 32, and the groove 40 therein, converge inwardly toward the chuck end of the housing. Consequently, with this particular construction, radially outward retraction of the key 38, to permit insertion of the drill 10 into the guide 12, or to permit removal of the drill therefrom, is not necessary since the chuck end of the groove 40 clears the key.

In either event, the key 38, when disposed in the longitudinal groove 40, maintains the drill bit 22 in a predetermine angular position relative to the guide 12. The guide member 14 of the guide 12 is provided therein with a window 46 through which the end of the drill bit 22 may be visually observed, when the drill 10 is in the guide 12, to insure accurate positioning of the end of the drill bit relative to a workpiece to be perpendicularly drilled.

The longitudinal rib 34 is detachably secured to the drill housing 16, as by screws 48, FIGS. 4 and 5. If necessary to insure an accurate sliding fit of the drill 10 within the guide member 14, a complementary shim 50 may be inserted under the detachable rib 34, i.e., between it and the drill housing 16. The thickness of the shim 50 is so selected as to provide the desired accurate sliding fit between the drill 10 and the guide member 14. After prolonged use, a thicker shim may be substituted to compensate for wear of the guide member 14 and/or the ribs 32, 34 and 36.

For convenience in handling, the drill 10 may be locked relative to the guide 12 in any desired longitudinal position by means of a set screw 52 threaded through the guide member 14 and engageable with one of the ribs 32, 34 and 36, e.g., the rib 36.

Mounted on one side of the guide member 14 externally thereof is a longitudinally adjustable stop means 54 for limiting the penetration of the drill bit 22 into the workpiece, as shown in FIG. 2 of the drawings. The stop means 54 includes a longitudinal boss 56, either intergral with or attached to the guide member 14, having therein a longitudinal guide passage 58 for a longitudinally adjustable stop 60 in the form of a longitudinally-extending pin securable in any desired adjusted position by a set screw 62 threaded into the boss 56. One end of the stop 60 is engageable by a stop 64 on the drill to limit penetration by the drill bit 22 to a desired predetermined extent.

Preferably, the stop 64 engages the end 65 of the guide member 14 before the chuck 20 can project from the opposite end 78 of the guide member. Thus, the chuck 20 can never engage the workpiece.

Integral with or connected to the guide member 14 adjacent the end 78 thereof and on opposite sides thereof are bosses 66 having therein longitudinally-extending guide passages 68 for longitudinally extensible and retractable legs 70 adapted to be secured in adjusted positions by set screws 72 threaded into the bosses 66. The legs 70 are provided thereon with indicia 74 indicating the angle of inclination of the drill guide 12 relative to a workpiece when the invention is used in a manner which will be described hereinafter.

An important feature of the invention is that, when the drill 10 is inserted into the guide 12 with the key 38 disposed in the groove 40, the legs 70 are disposed on opposite sides of the chuck 20 with the axis of the chuck, and thus the axis of the drill bit 22, disposed in the plane of the axes of the legs. The significance of this relation will be discussed hereinafter.

Considering the operation of the invention, when the drill 10 is inserted into the guide 12 with the groove 40 containing the key 38, the drill and guide combination may readily be maneuvered manually into any desired position by gripping the handle of the drill 10 with one hand and by gripping a suitable handle 76 on the drill guide 12 with the other. More particularly, by gripping the handles 18 and 76, the drill and guide combination may be maneuvered into a position to drill a perpendicular hole, may be maneuvered into position to drill a slanted hole in conjunction with the legs 70, may be maneuvered into position to drill a centered hole in the edge of a workpiece in conjunction with the legs 70, and the like, all as will now be described. If desired, the drill 10 and the guide 12 may be locked together, for the purposes of such maneuvering, by the set screw 52.

The outer or work-engaging end 78 of the guide member 14 is planar and is perpendicular to the axis of the chuck 20 and the drill bit 22. Thus, in order to drill a perpendicular hole into a workpiece having a planar surface, it is merely necessary to seat the end 78 of the guide member 14 against such planar surface, with the legs 70 in their retracted positions, and with the drill bit aligned with the desired point on such planar surface. The axis of the drill bit 22 may readily be brought into alignment with the point to be drilled by sliding the drill and guide combination into the proper position, as determined by visual observation through the window 46. The desired hole is then drilled by closing the switch 24 and sliding the drill 10 longitudinally of the guide 12. If it is desired to drill the hole to a predetermined depth less than the thickness of the workpiece, the adjustable stop 60 is first set in the corresponding position.

If it is desired to drill a slanted hole, the legs 70 are extended to positions, determined by the indicia 74 thereon, which will provide the desired angle of inclination. As shown in FIG. 6 of the drawings, the drill and guide combination is then manually supported in an inclined position wherein the work-engaging ends of the legs 70 and the opposite edge of the lower end 78 of the guide member 14 are in engagement with the surface of the workpiece. By closing the switch 24 and manually displacing the drill 10 longitudinally of the guide 12, the desired slanted hole is automatically drilled at the correct angle. If desired, the depth of such slanted hole may be controlled with the adjustable stop 60. It will be noted that it may be necessary to use a longer drill bit for slanted holes at extreme angles.

Referring to FIG. 7 of the drawings, to drill a centered hole 80 in an edge 82 of a workpiece 84, the legs 70 are extended and are caused to straddle and engage opposite sides of the workpiece, with the outer end 78 of the guide member 14 seated flat against the edge of the workpiece. By closing the switch 24 and displacing the drill 10 longitudinally of the guide 12, the drill bit 22 will drill the desired hole 80 precisely at the center of the edge 82 of the workpiece 84 since the axes of the legs 70 are coplanar with the axis of the drill bit 22. It will be understood, of course, that it is necessary for the legs 70 to have the same lateral dimensions in order to achieve the foregoing.

Thus, it will be apparent that the drill and guide combination of the invention may readily be maneuvered manually, with or without the use of the legs 70, into the positions necessary to perform quickly and accurately a wide variety of drilling operations, which is an important feature of the invention.

It should be pointed out that while, in the construction shown, the axis of the chuck 20 is eccentric, it may also be concentric. In this case, the legs 70 would be diametrically opposite each other. The operation would be the same.

Although an exemplary embodiment of the invention has been disclosed herein for purposes of illustration, it will be understood that various changes, modifications and substitutions may be incorporated in such embodiment without departing from the spirit of the invention as defined by the claims which follow.

I claim:
1. In a drill guide for a drill which includes a housing having a motor therein and which includes a chuck driven by the motor, the combination of:
   (a) a guide member;
   (b) interengageable guide means on said guide member and the drill housing for guiding the drill longitudinally of said guide member in a direction parallel to the axis of rotation of the chuck;
   (c) interengageable keying means on said guide member and the drill housing for keying the drill to said guide member against rotation relative thereto;

(d) said guide member having a work-engaging end in a plane perpendicular to the axis of rotation of the chuck;
(e) two longitudinally extensible and retractable legs carried by said guide member and having work-engaging ends movable longitudinally of said guide member into positions beyond said plane of said work-engaging end of said guide member;
(f) said legs being disposed on opposite sides of said guide member with their axes and the axis of rotation of said chuck in a common plane perpendicular to said plane of said work-engaging end of said guide member;
(g) means on said guide member for locking said legs to said guide member with said work-engaging ends of said legs in various adjusted positions relative to said plane of said work-engaging end of said guide member; and
(h) said work-engaging ends of said legs and a part of said work-engaging end of said guide member being engageable with a work surface to orient the axis of rotation of the chuck at an angle to such work surface when said legs are adjusted to positions wherein said work-engaging ends of said legs are beyond said plane of said work-engaging end of said guide member.

2. In a drill guide for a drill which includes a housing having a motor therein and which includes a chuck driven by the motor, the combination of:
(a) a guide member;
(b) interengageable guide means on said guide member and the drill housing for guiding the drill longitudinally of said guide member in a direction parallel to the axis of rotation of the chuck;
(c) interengageable keying means on said guide member and the drill housing for keying the drill to said guide member against rotation relative thereto;
(d) said guide member having a work-engaging end in a plane perpendicular to the axis of rotation of the chuck;
(e) two longitudinally extensible and retractable legs carried by said guide member and having work-engaging ends movable longitudinally of said guide member into positions beyond said plane of said work-engaging end of said guide member;
(f) said legs being disposed on opposite sides of said guide member with their axes and the axis of rotation of said chuck in a common plane perpendicular to said plane of said work-engaging end of said guide member;
(g) means on said guide member for locking said legs to said guide member with said work-engaging ends of said legs in various adjusted positions relative to said plane of said work-engaging end of said guide member;
(h) said work-engaging ends of said legs and a part of said work-engaging end of said guide member being engageable with a work surface to orient the axis of rotation of the chuck at an angle to such work surface when said legs are adjusted to positions wherein said work-engaging ends of said legs are beyond said plane of said work-engaging end of said guide member; and
(i) said legs having indicia thereon indicating the angle of inclination of the axis of rotation of the chuck to a work surface engaged by said work-engaging ends of said legs and said part of said work-engaging end of said guide member.

3. In a drill guide for a drill which includes a housing having a motor therein and which includes a chuck driven by the motor, the combination of:
(a) a guide member;
(b) interengageable guide means on said guide member and the drill housing for guiding the drill longitudinally of said guide member in a direction parallel to the axis of rotation of the chuck;
(c) interengageable keying means on said guide member and the drill housing for keying the drill to said guide member against rotation relative thereto;
(d) said guide member having a work-engaging end in a plane perpendicular to the axis of rotation of the chuck;
(e) two longitudinally extensible and retractable legs carried by said guide member and having work-engaging ends movable longitudinally of said guide member into positions beyond said plane of said work-engaging end of said guide member;
(f) said legs being disposed on opposite sides of said guide member with their axes and the axis of rotation of said chuck in a common plane perpendicular to said plane of said work-engaging end of said guide member;
(g) means on said guide member for locking said legs to said guide member with said work-engaging ends of said legs in various adjusted positions relative to said plane of said work-engaging end of said guide member;
(h) said work-engaging ends of said legs and a part of said work-engaging end of said guide member being engageable with a work surface to orient the axis of rotation of the chuck at an angle to such work surface when said legs are adjusted to positions wherein said work-engaging ends of said legs are beyond said plane of said work-engaging end of said guide member; and
(i) said guide member being generally cylindrical and receiving the drill therein and being provided therein with a drill-bit viewing window adjacent and in close proximity to said work-engaging end thereof and between said legs.

References Cited in the file of this patent
UNITED STATES PATENTS

| | | |
|---|---|---|
| 1,471,137 | Bowman | Oct. 16, 1923 |
| 2,238,304 | Belanger | Apr. 15, 1941 |
| 2,448,361 | Dudrick | Aug. 31, 1948 |
| 2,462,386 | Griffin | Feb. 22, 1949 |
| 2,483,060 | Niedelman et al. | Sept. 27, 1949 |
| 2,832,241 | Nelson | Apr. 29, 1958 |

FOREIGN PATENTS

| | | |
|---|---|---|
| 836,269 | Germany | Apr. 10, 1952 |